United States Patent
Hsu et al.

(10) Patent No.: US 9,635,633 B2
(45) Date of Patent: Apr. 25, 2017

(54) MULTIMEDIA SYNCHRONIZATION SYSTEM AND METHOD

(71) Applicant: Realtek Semiconductor Corp., Hsinchu (TW)

(72) Inventors: Chin-Yu Hsu, Chu Pei (TW); Sheng-Yu Sun, Hsin Chu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 15/013,953

(22) Filed: Feb. 2, 2016

(65) Prior Publication Data
US 2016/0323838 A1 Nov. 3, 2016

(30) Foreign Application Priority Data
Apr. 29, 2015 (TW) .............................. 104113635 A

(51) Int. Cl.
*H04B 7/10* (2006.01)
*H04W 56/00* (2009.01)

(52) U.S. Cl.
CPC ................................ *H04W 56/002* (2013.01)

(58) Field of Classification Search
CPC . H04W 56/002; H04B 1/7183; H04B 7/2662; H04B 7/2671; H04B 7/2678; H04B 7/2684; H04B 7/269; H04B 7/2696; H04L 7/00; H04L 7/10; H04L 7/06; H04L 7/041

USPC ................ 375/354, 356, 359, 360, 366, 368
See application file for complete search history.

(56) References Cited

U.S. PATENT DOCUMENTS

| | | | |
|---|---|---|---|
| 2009/0204843 A1 | 8/2009 | Celinski et al. | |
| 2014/0211680 A1* | 7/2014 | Seok | H04W 52/0216 370/311 |
| 2014/0293992 A1* | 10/2014 | Abraham | H04W 52/0225 370/350 |
| 2014/0314073 A1* | 10/2014 | Sugimoto | H04W 28/18 370/350 |
| 2016/0109558 A1* | 4/2016 | Sugita | G01S 5/30 367/117 |
| 2016/0262120 A1* | 9/2016 | Shani | H04W 40/244 |

FOREIGN PATENT DOCUMENTS

CN 102456347 A 5/2012
WO WO2005/013047 A2 2/2005

* cited by examiner

*Primary Examiner* — Siu Lee
(74) *Attorney, Agent, or Firm* — Muncy, Geissler, Olds & Lowe, P.C.

(57) ABSTRACT

A multimedia synchronization system used in a wireless local area network is provided. The multimedia synchronization system includes a first multimedia device and a second multimedia device. The first multimedia device wirelessly transmits a beacon, in which the beacon includes a timestamp. The second multimedia device is connected to the first multimedia device through the wireless local area network for receiving the beacon from the first multimedia device and synchronizing with the first multimedia device according to the timestamp of the beacon.

8 Claims, 6 Drawing Sheets

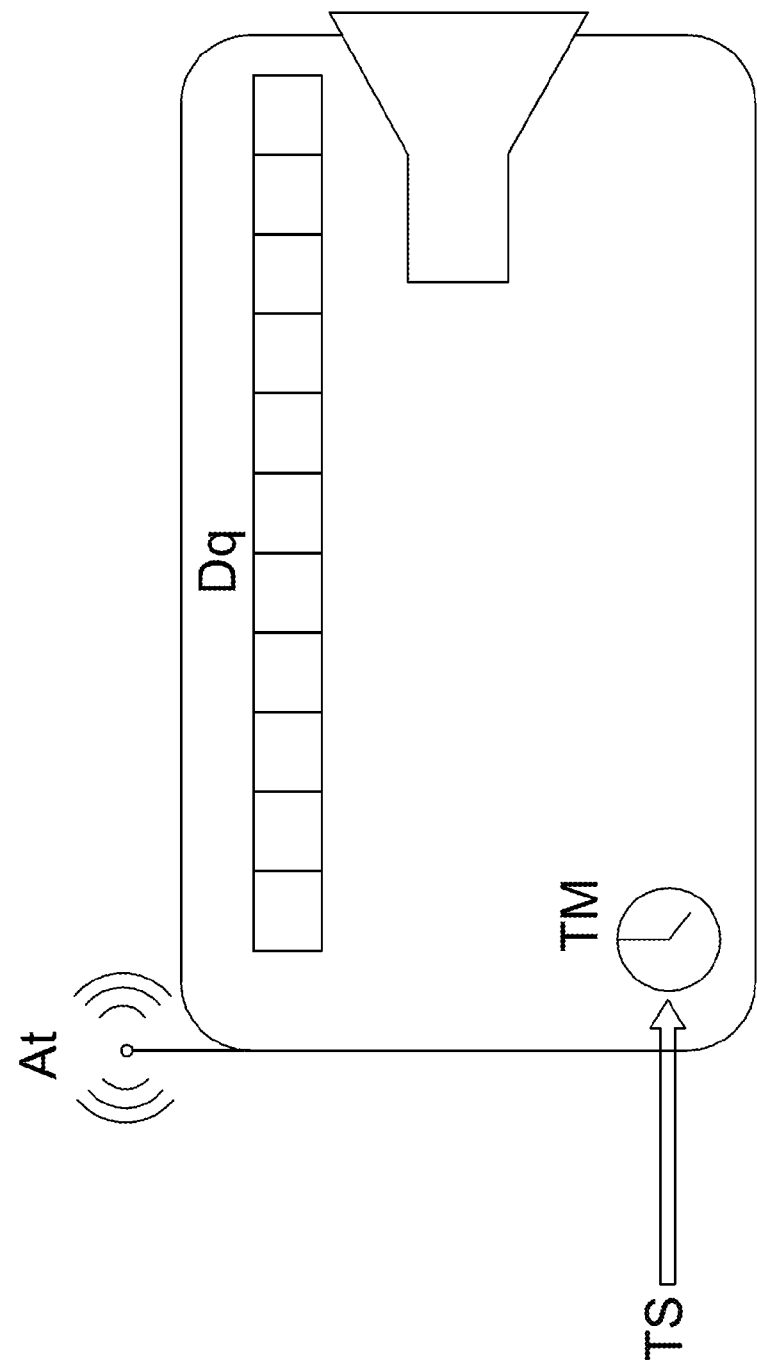

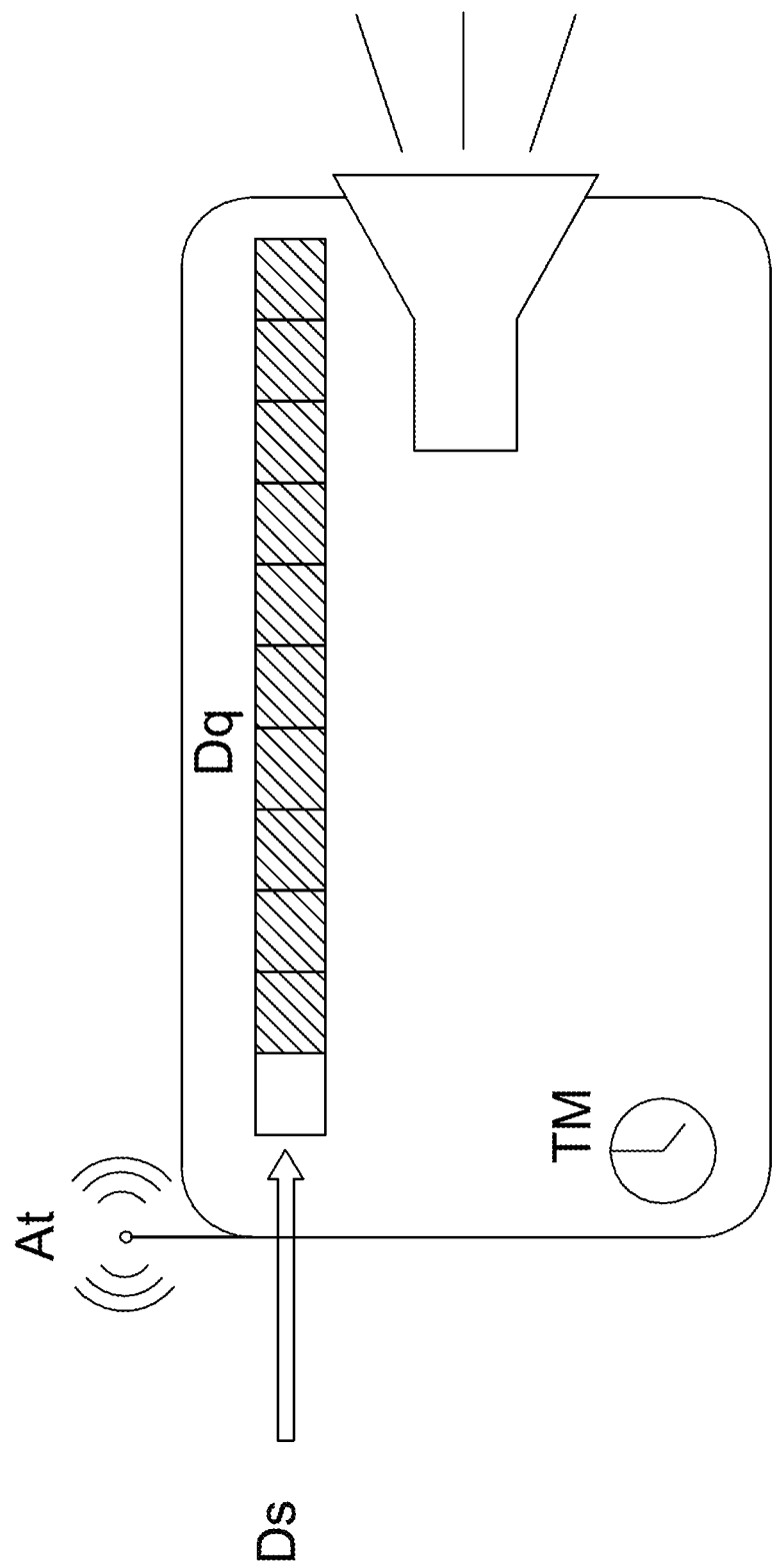

MULTIMEDIA SYNCHRONIZATION SYSTEM AND METHOD

BACKGROUND a. Field of the Invention

The present disclosure relates to a multimedia synchronization system and method. More particularly, the present disclosure relates to a multimedia synchronization system and method used in a wireless local area network.

b. Description of the Related Art

Typically, when an audio player plays streaming audio content, the audio player may control a sample time of each audio sample according to a sample rate specified in the audio content, such that the audio content is played smoothly. However, in order to allow two or more audio players to simultaneously play the same piece of audio content, these audio players are required to play the same audio sample at the same time.

In a conventional method, the audio player may use an interface protocol (such as network time protocol/simple network time protocol, NTP/SNTP) to synchronize the system time of each audio player. Therefore, multiple audio players may play the audio content smoothly according to the timing information and sample rate recorded in the audio content and the synchronized system time.

However, in the method mentioned above, one of the audio players is required to serve as a host server for providing coordinated universal time (UTC) and for receiving time synchronization requests conforming to a network time protocol/simple network time protocol from other audio players. Normally, the clock synchronization precision of the network time protocol/simple network time protocol is in the range of 50 milliseconds for a wide-area network and about 1 millisecond for a local-area network. Therefore, in case the local-area network is not provided with a UTC host server, the system time is instead corrected by the network time protocol/simple network time protocol of a wide-area network. However, the clock synchronization precision of the wide-area network is comparatively low (about 50 milliseconds) such that synchronization errors among different audio players might occur more often. Though the local-area network may be provided with a UTC host server to reduce synchronization errors and to improve synchronization precision, this may increase fabrication costs.

Therefore, it is desirable to make multiple audio players simultaneously play the same piece of audio content in a wireless local area network with reduced fabrication costs and less time synchronization errors.

BRIEF SUMMARY OF THE INVENTION

One objective of the present disclosure is to simultaneously reduce fabrication costs of media players and time synchronization errors among media players.

According to an embodiment of the disclosure, a multimedia synchronization system used in a wireless local area network includes a first multimedia device and a second multimedia device. The first multimedia device wirelessly transmits a beacon, in which the beacon includes a timestamp. The second multimedia device is connected to the first multimedia device through the wireless local area network for receiving the beacon from the first multimedia device and synchronizing with the first multimedia device according to the timestamp of the beacon.

According to another embodiment of the disclosure, a multimedia synchronization method for a multimedia system having a first multimedia device and a second multimedia device includes the following steps. First, the first multimedia device is used to wirelessly transmit a beacon, in which the beacon includes a timestamp. Then, the second multimedia device is connected to the first multimedia device through a wireless local area network, and the second multimedia device receives the beacon from the first multimedia device and synchronizes with the first multimedia device according to the timestamp of the beacon.

According to the embodiments mentioned above, the multimedia synchronization system uses the standard of a wireless local area network to allow multiple multimedia devices to have a common time reference based on an identical timestamp. Therefore, when a multimedia device plays multimedia content, the multimedia devices have a common time reference to simultaneously play the same data of the multimedia content without suffering defects of the conventional designs.

BRIEF DESCRIPTION OF THE DRAWINGS

FIG. 3A is a schematic diagram illustrating exemplified operations of the speaker in FIG. 1A.

FIG. 3C is a schematic diagram illustrating exemplified operations of a speaker in FIG. 1A.

DETAILED DESCRIPTION OF THE INVENTION

It is to be understood that other embodiments may be utilized, and structural changes may be made without departing from the scope of the present disclosure.

Figure 1:
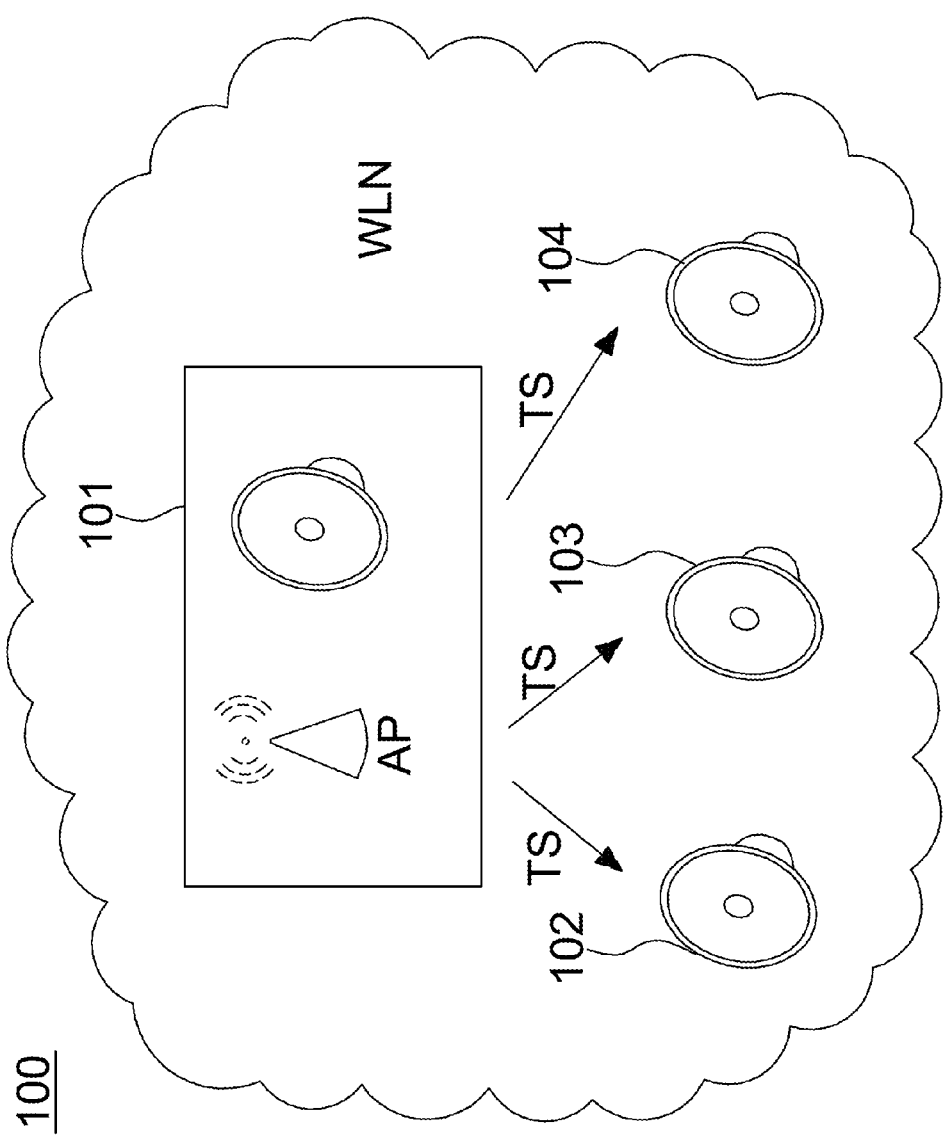
FIG. 1 is a schematic diagram illustrating a multimedia synchronization system according to an embodiment of the present disclosure.
Figure 3B:
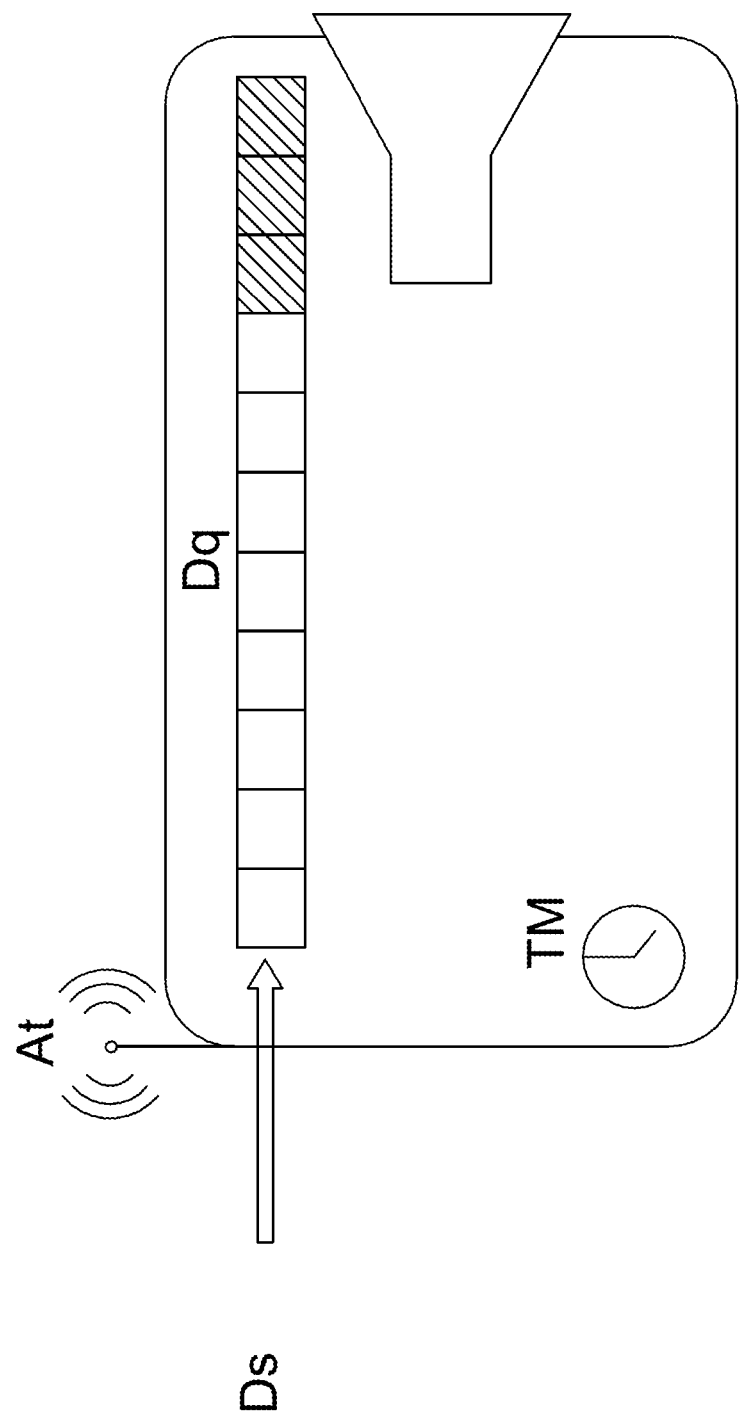
FIG. 3B is a schematic diagram illustrating exemplified operations of a speaker in FIG. 1A.

FIG. 1 is a schematic diagram illustrating a multimedia synchronization system 100 for processing audio signals according to an embodiment of the disclosure. The multimedia synchronization system 100 is within a wireless local area network WLN. The multimedia system includes a first speaker 101, a second speaker 102, a third speaker 103 and a fourth speaker 104. At least one of the speakers 101-104 serves the function of a wireless access point AP. In this embodiment, the first speaker 101 is selected to function as a wireless access point AP. The first speaker 101 is configured to provide a beacon TS including a timestamp. The speakers 102, 103 and 104 are connected to the first speaker 101 via the wireless local area network WLN and synchronize with the first speaker 101 according to the beacon TS having a timestamp. In addition, each of the speakers 101-104 includes at least one antenna for receiving or transmitting wireless signals. For example, the antenna may be in the form of an antenna At of the second speaker 102 shown in FIGS. 3A, 3B and 3C.

In one embodiment, the speakers 102, 103 and 104 may be set by the first speaker 101 such that the speakers 102, 103 and 104 only receive wireless signals from the first speaker 101.

In one embodiment, the beacon TS conforms to a time synchronization function (TSF) of the wireless local area network WLN.

In one embodiment, the wireless local area network WLN conforms to IEEE standard 802.11, such as IEEE standard 802.11a, IEEE standard 802.11b, IEEE standard 802.11g, IEEE standard 802.11n, or IEEE standard 802.11ac.

Figure 2:
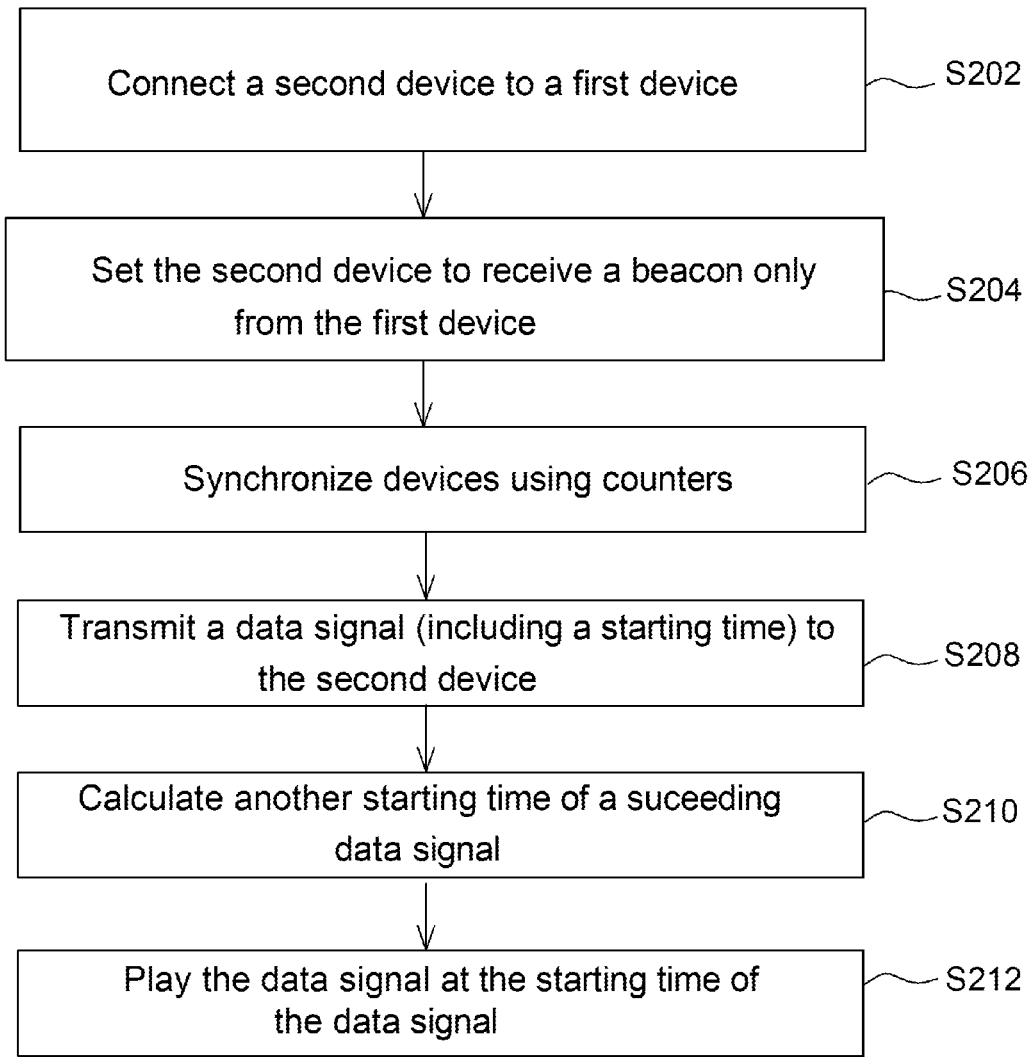
FIG. 2 is a flow diagram illustrating a multimedia synchronization method according to an embodiment of the present disclosure.

FIG. 2 is a flow diagram illustrating a multimedia synchronization method according to an embodiment of the disclosure. The method includes steps S202, S204, S206, S208, S210 and S212.

In step 202, a second device (e.g., speaker 102, speaker 103 or speaker 104) is connected to a first device (e.g., speaker 101), in which the first device serves the function of a wireless access point.

In step S204, the second device is set by the first device serving the function of the wireless access point, such that the second device receives a beacon only from the first device, in which the beacon includes a timestamp. For example, as shown in FIG. 1, the second speaker 102 (i.e., the second device), the third speaker 103 and the fourth speaker 104 are set by the first speaker 101 (i.e., the first device) serving the function of a wireless access point AP, such that the speakers 102-104 receive the beacon TS only transmitted from the first speaker 101, which insures the speakers 102, 103 and 104 are not interfered by other signals.

In step S206, counters in the first device and second device are being synchronized. That is, the synchronization between the second device and the first device serving the function of a wireless access point is implemented. For example, as illustrated in FIG. 1, the step S206 ends until the second speaker 102, the third speaker 103 and the fourth speaker 104 finish synchronizing with the first speaker 101.

Referring to both FIG. 1 and FIG. 3A, the first speaker 101 and the second speaker 102 are used as examples of the first device and the second device respectively, and used for illustrating details of the steps mentioned above. First, the first speaker 101 is selected to function as a wireless access point AP. After the multimedia player system 100 receives an audio content, the first speaker 101 functioning as the wireless access point AP wirelessly transmits a beacon including a timestamp. The second speaker 102 is connected to the first speaker 101 via the wireless local area network WLN, and a counter TM of the second speaker 102 is synchronized according to the beacon TS provided by the first speaker 101, such that the second speaker 102 is synchronized with the first speaker 101. It should be noted that, at this time, a data queue Dq of the second speaker 102 has not received a data signal Ds (part or all of the mentioned audio content, not shown in FIG. 3A) of the first speaker 101. Therefore, the data queue Dq is in a state of carrying no data. Similarly, the counters of the third speaker 103 and the fourth speaker 104 (similar to the counter TM of the second speaker 102) synchronize with the first speaker 101. As a result, all speakers 101-104 in the wireless local area network WLN have common time reference. It should be noted that the time when the first speaker 101 functioning as a wireless access point AP transmits the beacon TS including a timestamp is not limited to the time after the multimedia player system 100 receives the audio content. Alternatively, the first speaker 101 functioning as a wireless access point AP may transmit a beacon TS having a timestamp at regular intervals to synchronize with the speakers 102, 103 and 104 after the first speaker 101 is turned on.

In step S208, a data signal (e.g., multimedia data, audio data, etc) is transmitted to the second device. The data signal Ds includes information of a starting time for playing the data signal. In one embodiment, referring to FIG. 1 and FIG. 3B, after the first speaker 101 and the second speaker 102 are synchronized using the counters TM, the first speaker 101 transmits a data signal Ds to the second speaker 102 and assigns a starting time ts0 (not shown in figures) for playing the data signal Ds. At this time, the data queue Dq of the second speaker 102 begins to receive the data signal Ds transmitted from the first speaker 101 via wireless transmission. The data in the data queue Dq are indicated by hatched squares shown in FIG. 3B and FIG. 3C. Also, the third speaker 103 and the fourth speaker 104 operate in a similar way as described above.

In one embodiment, the first speaker 101 assigns the starting time ts0 of the data signal Ds as the sum of the common time reference obtained through synchronization and a buffer time period.

In one embodiment, the buffer time period is, but not limited to, 0.5, 1 or 2 seconds.

In step S210, a starting time of a succeeding data signal is calculated. The starting time of a succeeding data signal is determined according to the starting time ts0 and the play time length dt0 (not shown in the figures) of the data signal, in which the play time length dt0 is obtained by the second device (e.g., the second speaker 102). In one embodiment as illustrated in FIG. 1 and FIG. 3C, the second speaker 102 and the first speaker 101 synchronize with each other in Step 206 and are provided with a common time reference and a starting time for play ts0. Then, the second speaker 102 performs a data conversion on a received data signal to obtain a play time length dt0, and to further obtain a starting time for playing a succeeding data signal (ts0+dt0). Also, the third speaker 103 and the fourth speaker 104 operate in a similar way as described above.

In step S212, the data signal are simultaneously played at the starting time ts0. In one embodiment as illustrated in FIG. 1 and FIG. 3C, the second speaker 102 plays the data signal Ds in the data queue Dq according to the starting time ts0. That is, the first speaker 101 and second speaker 102 simultaneously output the data signal Ds at the starting time ts0. Further, the third speaker 103 and the fourth speaker 104 operate in a similar way as the second speaker 102, so that the speakers 101-104 simultaneously play the data signal Ds at the starting time ts0 to achieve the effect of simultaneously playing the same audio data. It should be noted that, after the first speaker 101, the second speaker 102, the third speaker 103 and the fourth speaker 104 have finished playing the data signal Ds, the first speaker 101, the second speaker 102, the third speaker 103 and the fourth speaker 104 play a succeeding data signal Ds at a next starting time (i.e., ts0+dt0), and the second speaker 102, the third speaker 103 and the fourth speaker 104 perform a conversion on the succeeding data signal Ds to obtain a play time length dt1 (not shown) and further to obtain a starting time of another data signal Ds after the succeeding data signal Ds(ts0+dt0+dt1) is obtained. Similar operations are performed to obtain starting times of the succeeding data signals.

According to the above embodiment, the multimedia synchronization system 100 uses the standard of a wireless local area network to allow the first speaker 101 to supply a beacon TS having a timestamp to other speakers 102, 103 and 104, so that all speakers 101-104 may have a common time reference based on an identical timestamp. Therefore, when a multimedia player plays audio content, the speakers 101-104 may have a common time reference to simultaneously play the same data (such as the data signal Ds). In addition, the time synchronization mechanism (such as the time synchronization function) of a wireless local area network provides a relative time reference but not an absolute time reference of a network time protocol/simple network time protocol. Therefore, for example, according to the IEEE standard 802.11 for a wireless local area network, it may reach a high precision of time synchronization with the range of microseconds. As a result, an accurately synchronized play is achieved according to the above embodiments without suffering the defects of conventional designs.

Figure 4:
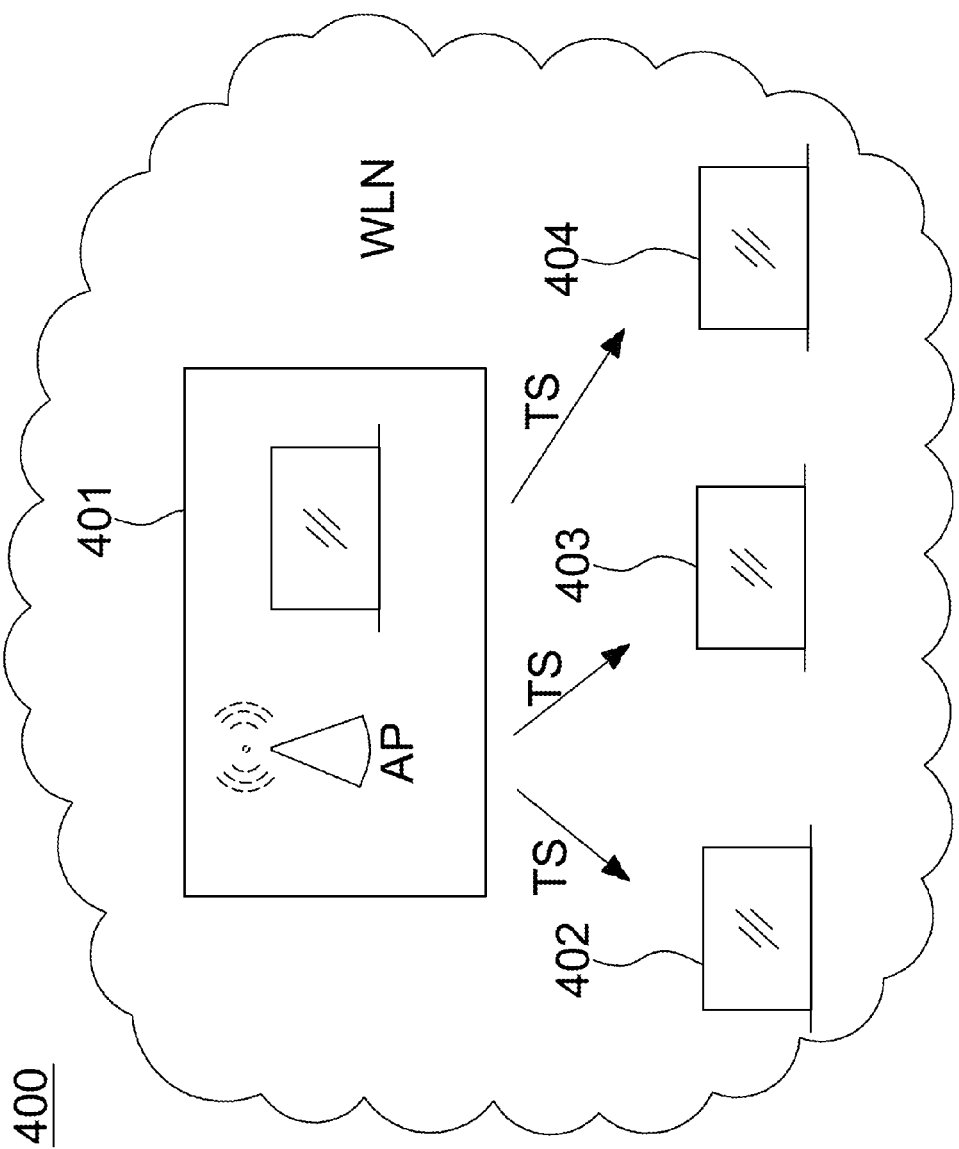
FIG. 4 is a schematic diagram illustrating a multimedia synchronization system according to an embodiment of the disclosure.

Referring to FIG. 4, FIG. 4 is a schematic diagram of a multimedia synchronization system 400 according to another embodiment of the disclosure. The multimedia synchronization system 400 is used to process video signals, or to process both of video and audio signals. The multimedia synchronization system 400 is in a wireless local area network WLN and includes a first display 401, a second display 402, a third display 403, and a fourth display 404. At least one of the displays 401-404 may serve the function of a wireless access point AP. In this embodiment, the first display 401 is selected to function as a wireless access point AP. The first display 401 is configured to provide a beacon TS having a timestamp. The displays 402, 403 and 404 are connected to the first display 401 via the wireless local area network WLN and synchronize with the first display 401 according to the beacon TS having a timestamp. In addition, each of the displays 401-404 includes at least one antenna for receiving or transmitting wireless signals. A person skilled in the art can understand the operation of this embodiment of the disclosure according to the above mentioned multimedia synchronization method. Therefore, a detailed operation description is omitted herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present invention cover modifications and variations of this invention provided they fall within the scope of the following claims.

What is claimed is:

1. A multimedia synchronization system, used in a wireless local area network, comprising:
    a first multimedia device, configured to wirelessly transmit a beacon, in which the beacon includes a timestamp; and
    a second multimedia device, connected to the first multimedia device through the wireless local area network, configured to receive the beacon from the first multimedia device and to synchronize with the first multimedia device according to the timestamp of the beacon;
    wherein, after the first multimedia device and the second multimedia device synchronize with each other, the first multimedia device outputs a first data signal to the second multimedia device and assigns the first data signal a starting time, the first data signal comprises information of the starting time, and the second multimedia device and the first multimedia device play the first data signal according to the starting time.

2. The multimedia synchronization system as claimed in claim 1, wherein the timestamp of the beacon conforms to a time synchronization function of the wireless local area network.

3. The multimedia synchronization system as claimed in claim 1, wherein the second multimedia device is set to receive wireless signals only from the first multimedia device.

4. The multimedia synchronization system as claimed in claim 1, wherein the second multimedia device performs a data conversion on the first data signal to obtain a first play time length and to calculate a starting time of a second data signal wirelessly transmitted from the first multimedia device, the starting time of the second data signal is the sum of the starting time of the first data signal and the first play time length, and the second data signal is a succeeding signal subsequent to the first data signal.

5. A multimedia synchronization method for a multimedia system, the multimedia system comprising a first multimedia device and a second multimedia device, and the multimedia synchronization method comprising:
    using the first multimedia device to wirelessly transmit a beacon, in which the beacon includes a timestamp;
    connecting the second multimedia device to the first multimedia device through a wireless local area network, and the second multimedia device receiving the beacon from the first multimedia device and synchronizing with the first multimedia device according to the timestamp of the beacon;
    outputting a first data signal to the second multimedia device by the first multimedia device and assigning the first data signal a starting time after the first multimedia device and the second multimedia device synchronize with each other, wherein the first data signal comprises information of the starting time; and,
    using the second multimedia device and the first multimedia device to play the first data signal according to the starting time.

6. The multimedia synchronization method as claimed in claim 5 wherein the timestamp of the beacon conforms to a time synchronization function of the wireless local area network.

7. The multimedia synchronization method as claimed in claim 5 wherein the second multimedia device is set to receive wireless signals only from the first multimedia device.

8. The multimedia synchronization method as claimed in claim 5, further comprising:
    performing a data conversion on the first data signal to obtain a first play time length; and
    calculating a starting time of a second data signal, wherein the starting time of the second data signal is the sum of the starting time of the first data signal and the first play time length, and the second data signal is a succeeding signal subsequent to the first data signal.

* * * * *